United States Patent
Zernickel

[19]
[11] Patent Number: 6,062,736
[45] Date of Patent: May 16, 2000

[54] PRE-TENSIONED RADIAL ROLLING BEARING

[75] Inventor: Alexander Zernickel, Herzogenaurach, Germany

[73] Assignee: Ina Walzlager Schaeffler oHG, Germany

[21] Appl. No.: 09/230,124

[22] PCT Filed: Jun. 6, 1997

[86] PCT No.: PCT/EP97/02940

§ 371 Date: Jan. 28, 1999

§ 102(e) Date: Jan. 28, 1999

[87] PCT Pub. No.: WO98/04845

PCT Pub. Date: Feb. 5, 1998

[30] Foreign Application Priority Data

Jul. 26, 1996 [DE] Germany .......................... 196 30 293

[51] Int. Cl.[7] ................................................. F16C 19/22
[52] U.S. Cl. ........................................... 384/581; 384/535
[58] Field of Search ...................................... 384/581, 535

[56] References Cited

U.S. PATENT DOCUMENTS

| | | | |
|---|---|---|---|
| 3,009,748 | 11/1961 | Pitner | 384/581 |
| 3,653,731 | 4/1972 | Rau | 384/581 |
| 3,790,240 | 2/1974 | Pitner | 384/581 |
| 4,541,742 | 9/1985 | Lederman | 384/518 |
| 5,020,925 | 6/1991 | Stephan et al. | 384/581 X |
| 5,839,835 | 11/1998 | Zernickel et al. | 384/535 X |

FOREIGN PATENT DOCUMENTS

| | | |
|---|---|---|
| 0412870 | 2/1991 | European Pat. Off. . |
| 1507257 | 2/1968 | France . |
| 2367937 | 5/1978 | France . |
| 2382611 | 9/1978 | France . |
| 6934600 | 8/1969 | Germany . |
| 2502323 | 7/1975 | Germany . |
| 2745826 | 4/1979 | Germany . |
| 2337309 | 1/1983 | Germany . |
| 4440313 | 8/1995 | Germany . |
| 4438564 | 2/1996 | Germany . |

*Primary Examiner*—Thomas R. Hannon
*Attorney, Agent, or Firm*—Bierman, Muserlian and Lucas

[57] ABSTRACT

A thin-walled inner bushing (1) comprising a raceway (5) which is provided with elastically yielding raceway convexities (2) which merge at one end into radially extending sections (7) which are connected to one another by a further, outer bushing (9) whereby play can be eliminated from the bearing even without the hitherto required intermediate rings of polymer material.

5 Claims, 1 Drawing Sheet

PRE-TENSIONED RADIAL ROLLING BEARING

FIELD OF THE INVENTION

The invention concerns a radial rolling bearing in which at least one of the raceways has in at least one peripheral section, an elastically yielding raceway convexity which deviates from its circular shape so that at least one of the rolling elements is radially pre-tensioned between the raceway convexity and a raceway situated opposite thereto.

BACKGROUND OF THE INVENTION

A generic radial bearing of the pre-cited type is known from DE 36 26 626 A1. A shaft forms an inner raceway for a needle crown ring whose outer raceway is formed by a bushing which comprises on several points, an elastically yielding raceway convexity deviating from the circular shape, said bushing being surrounded by a tolerance ring of an elastic material that is fixed in a housing bore. Due to the elastic tolerance ring, the bearing needles are in contact with both raceways at the points of the bushing deviating from the circular shape i.e., the bearing needles are radially pre-tensioned. Such a bearing, on the one hand, is expensive, and on the other hand, due to some flexibility of the tolerance ring, it has only a limited rigidity.

A further bearing is known from DE-OS 27 45 826. In this bearing, the rolling elements roll in a region which permits a radial deformation. This region continues coaxially into a cylindrical region with which the bearing is retained.

SUMMARY OF THE INVENTION

The object of the invention is therefore to develop a generic bearing further so that it has an increased rigidity and the required elastic tolerance ring can be dispensed with.

The invention achieves this object according to the characterizing part of claim 1 in that the raceway having the elastic raceway convexity is configured as a thin-walled inner bushing with a uniform wall thickness and merges at one end at circumferentially spaced points into radially outwards extending sections which are connected to one another by a second, outer bushing which extends coaxially to the central longitudinal axis and comprises in at least one peripheral section, an elastically yielding convexity which deviates from its circular shape.

Because the inner bushing which produces the pre-tension is supported on its circumferentially spaced, radially extending sections, there are formed between these sections, empty spaces into which the mounted shaft can deflect upon overcoming the pre-tension of the inner bushing. Thus, the hitherto required tolerance ring of elastomer can be dispensed with. The second, outer bushing effects, above all, that tolerances in the housing bore can be bridged without any problem.

According to claim 2, the radially extending sections i.e., the inner bushing comprises inwards directed retaining tongues. Such retaining tongues prevent the rolling bearing crown ring which is guided in a cage from migrating out of the bearing in axial direction.

In a further development of the invention according to claim 3, the radially extending sections extend relative to the central longitudinal axis at an angle which is larger or smaller than 90°. In this way, it is possible to vary the axial dimension of the second, outer bushing which extends coaxially to the central longitudinal axis. If the angle of inclination is less than 90°, the axial dimension of the second bushing can be shortened i.e., the overall axial width of the second bushing would be smaller than the actual running surface of the bearing. With an angle larger than 90°, the situation is reversed i.e., the axial dimension of the second bushing in this case would be larger than the axial running surface of the bearing.

Finally, according to claims 4 and 5, the rolling elements are configured as bearing needles or as bearing balls and the radial rolling bearing is used as a steering bearing in automotive vehicles.

The invention will be described more closely with reference to the following example of embodiment.

DETAILED DESCRIPTION OF THE DRAWINGS

Figure 1:
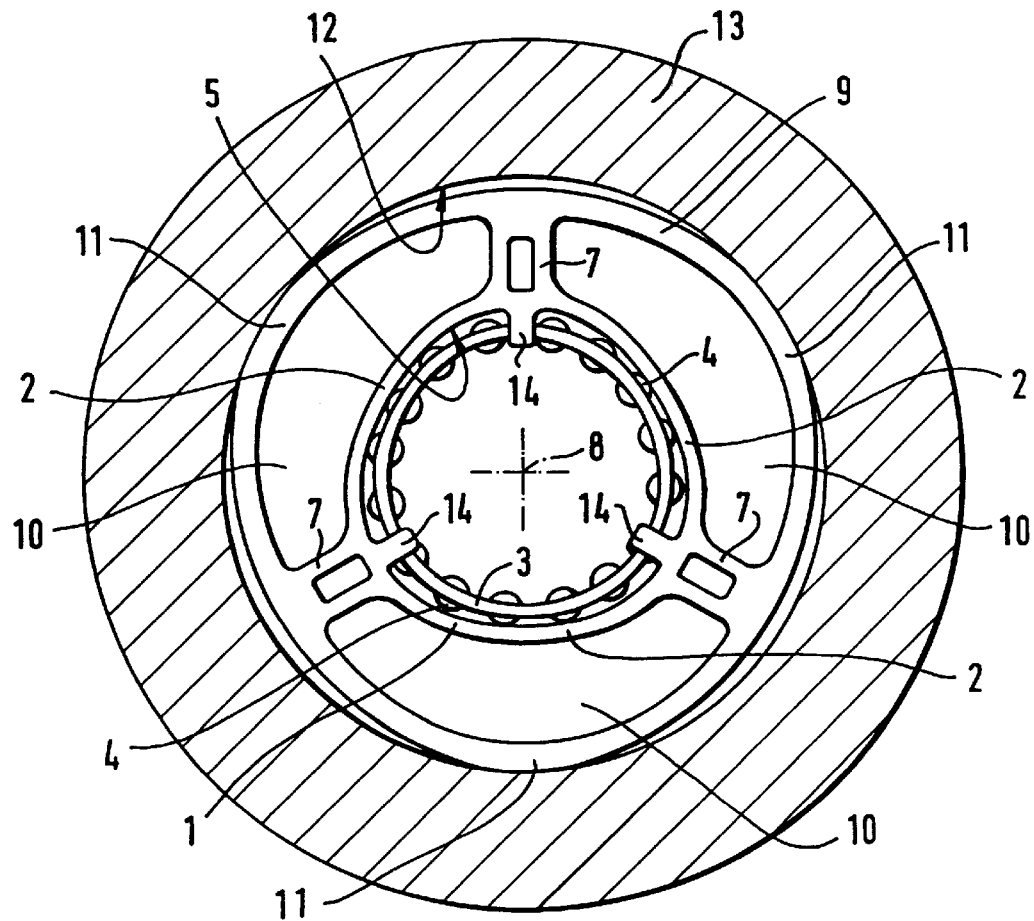
FIG. 1 shows a cross-section and FIG. 2 shows a longitudinal section through a radial rolling bearing in accordance to the invention.
Figure 2:
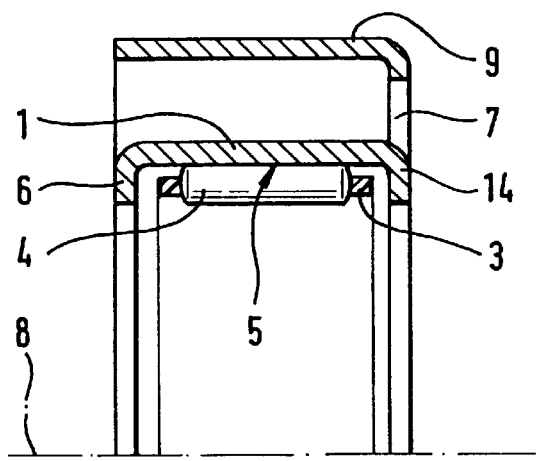

The radial rolling bearing represented in FIGS. 1 and 2 is made by a non-chipping shaping procedure and comprises a thin-walled inner bushing 1 comprising raceway convexities (2) on three peripheral sections offset at 120° to one another. These raceway convexities (2) yield elastically in radial direction so that a shaft, not illustrated, is firmly clamped in these three peripheral regions because the bearing needles 4 guided in a cage 3 bear firmly both against an outer raceway 5 of the inner bushing 1 and against a raceway formed by the peripheral surface of the shaft.

At one end, the inner bushing 1 comprises a radially inwards pointing flange 6 and merges at three peripheral points on the other end into radially outwards extending sections 7 which are connected to one another by a second, outer bushing 9 which extends coaxially to the central longitudinal axis 8. Due to the apertures 10 formed between the bushing 1 and the bushing 9, a radial springing of the shaft mounted in the needle crown ring is possible. The second, outer bushing 9 in its turn also comprises elastically yielding convexities 11 in three peripheral regions so that dimensional tolerances of a bore 12 of a housing 13 can be compensated by these convexities. An axial migration of the bearing needles 4 guided in the cage 3 is prevented on one side by the flange 6 and on the other side by the retaining tongues 14 arranged on the inner bushing 1. The retaining tongues 14 can also be realized by punchings made in the sections 7 and bent radially inwards.

Such a radial rolling bearing according to the invention can be used particularly advantageously as a steering shaft bearing because, on the one hand, the desired pre-tension is obtained without additional intermediate polymer rings and, on the other hand, housing deviations can be compensated by the bearing itself.

What is claimed is:

1. A radial rolling bearing in which at least one of the raceways (5) has in at least one peripheral section, an elastically yielding raceway convexity (2) which deviates from its circular shape so that at least one of the rolling elements is radially pretensioned between the raceway convexity (2) and a raceway situated opposite thereto, characterized in that the raceway (5) having the elastic raceway convexity (2) is configured as a thin-walled inner bushing (1) with a uniform wall thickness and merges at one end at circumferentially spaced points into radially outwards extending sections (7) which are connected to one another by a second, outer bushing (9) which extends coaxially to the central longitudinal axis (8) and comprises in at least one peripheral section, an elastically yielding convexity (11) which deviates from its circular shape.

2. A radial rolling bearing according to claim 1, wherein the radially extending sections (7) of the inner bushing (1) comprises inwards directed retaining tongues (14).

3. A radial rolling bearing according to claim 1, wherein the radially extending sections (7) extend relative to the central longitudinal axis (8) at an angle which is larger or smaller than 90°.

4. A radial rolling bearing according to claim 1, wherein the rolling elements are configured as bearing needles (4) or as bearing balls.

5. A radial rolling bearing according to claim 1, wherein it is used as a steering bearing in automotive vehicles.

* * * * *